Oct. 28, 1947.  D. J. CAMPBELL ET AL  2,429,606
APPARATUS FOR RANGE PARALLAX CORRECTION
Filed July 30, 1943  2 Sheets-Sheet 1
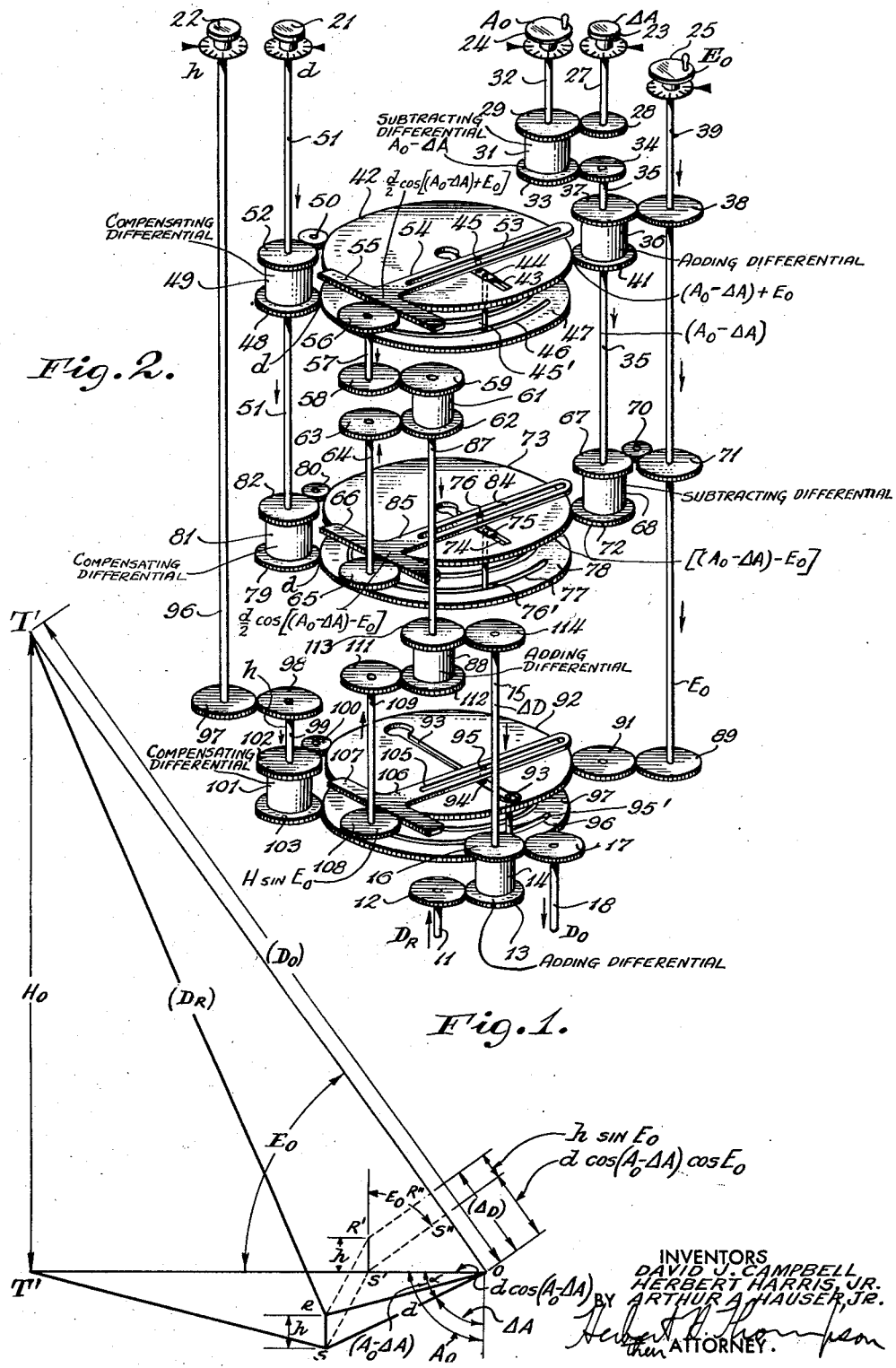
INVENTORS
DAVID J. CAMPBELL
HERBERT HARRIS, JR.
ARTHUR A. HAUSER, JR.
BY
ATTORNEY.

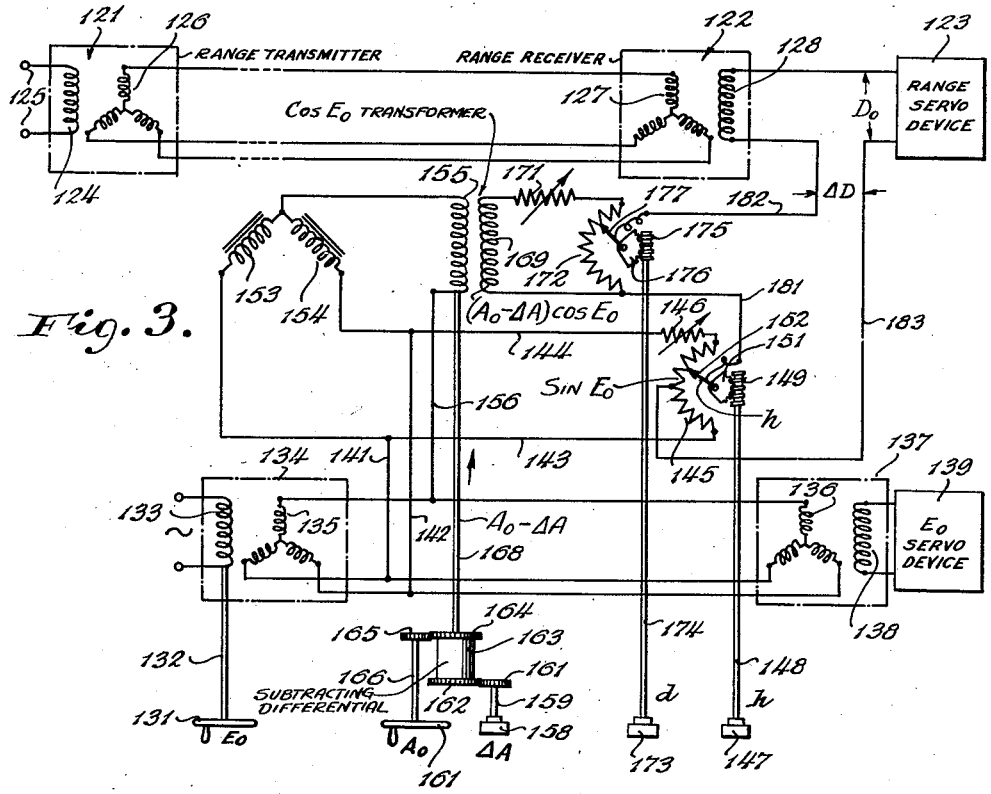

Patented Oct. 28, 1947

2,429,606

UNITED STATES PATENT OFFICE 2,429,606

APPARATUS FOR RANGE PARALLAX CORRECTION

David J. Campbell, Richmond Hill, Herbert Harris, Jr., Cedarhurst, and Arthur A. Hauser, Jr., Garden City, N. Y., assignors to Sperry Gyroscope Company, Inc., a corporation of New York Application July 30, 1943, Serial No. 496,734

6 Claims. (Cl. 235—61.5)

This invention relates to a range parallax corrector in which the range as measured by a range finder is corrected for parallax between the range finder and a reference point to determine the range of the object relative to said reference point.

In fire control systems it is essential that the range of targets relative to a reference point be ascertained accurately. This is particularly necessary in order to effectively combat attacks from the air. Considerable development has taken place in the field of anti-aircraft fire control in order to obtain a more accurate measure of the range of targets. Frequently, it is convenient to have the range finder separated from other elements of the system.

As the range finders have become more accurate, the effect of parallax between the range finder and a sighting instrument, gun, director, or other reference point, has become material. If the range finder is located at any appreciable distance from the director or other reference point of the system, the range of a target as measured by the range finder may not be the same as the range measured with respect to the reference point. In such cases, an accurate measure of the range between the object and the reference point may only be obtained by a range parallax correction.

It is therefore the main object of the present invention to provide a method and apparatus for correcting range for parallax between the range finder and a selected reference point.

Another object of the invention is to provide a method and apparatus for range parallax correction wherein the measured range is combined with a correction value to obtain the correct range of an object with respect to the reference point of the system.

A further object of the invention is to provide a range parallax corrector in which the range difference value is determined in a manner so it can readily be added to the measured range in order to obtain the desired range with respect to the reference voltage.

A further object of the invention is to provide a range parallax corrector in which the range difference value is determined by mechanical means and may be combined with a mechanical representation of the measured range.

A still further object of the invention is to provide a range parallax corrector in which a correction is effected electrically, and the range difference value may be combined with an electrical representation of the range measured by the range finder.

Further objects and advantages of the invention will become apparent from the following specification, taken in connection with the accompanying drawings, wherein Fig. 1 is a space diagram showing the relationship of the range finder, reference point, and an object, and illustrating the trigonometric relationships involved.

Fig. 2 is a schematic perspective view of a mechanical range parallax corrector embodying the invention.

Fig. 3 is a schematic diagram of an electrical range parallax corrector embodying the invention, and Fig. 4 is a schematic diagram of a modified form of electrical parallax corrector.

As a result of a detailed analysis it has been found that an accurate parallax correction for range may be obtained with a reasonably simplified apparatus by making certain approximations. Referring now to Fig. 1 wherein O represents the reference point, R represents the range finder, and T represents the target, it has been found that an accurate range correction is obtained by determining the length of a projection of the distance OR between the reference point and the range finder on the line OT between the reference point and the object or target. This projection is represented by the line OR" and is designated $\Delta D$. As the target moves, it will be apparent that the length of the range difference value $\Delta D$ varies according to the angular position of the target relative to the reference point. For this reason the correction computing mechanism must necessarily be continuously supplied with data corresponding to the angular position of the target.

The reference point O will be assumed to be a gun director or the like, or a radar equipment having means for tracking the object or target T in elevation and azimuth. Continuous measures of the elevation angle $E_0$ and the azimuth angle $A_0$ of the target are obtained by the tracking device with respect to O. A feature of the invention is the provision of means for considering the difference in level between the range finder R and the tracking device when such difference in level exists. In the following description of the invention it will be assumed that there is a difference in level between R and O. The actual difference in level is determined in the known manner and the horizontal component $d$ and the vertical component $h$ of the line OR are set into the apparatus and these values do not change as long as the relative positions of the range finder R and the tracking device at O remain unchanged. Likewise the azimuth angle $\Delta A$ by which the range finder R is offset from point O is measured and is set into the parallax computer as a fixed known value once the range finder and tracking device have been set in their operating positions.

As will be explained below, the azimuth angle $\alpha$ is obtained by subtracting $\Delta A$ from $A_0$. The range finder R merely furnishes to the point O the measure of slant range $D_r$, from the range finder to the target and beyond this is not concerned with any of the changing angular positions of the target.

In order for $D_r$ to be of value at the tracking point O, it must be corrected there for the changing azimuth $A_0$ and elevation $E_0$ angles of the target to give slant range $D_0$ of the target T with respect to the tracking device at point O.

It will be apparent from an inspection of Fig. 1 that due to the changing position of the target or object T in elevation and azimuth rather complex relationships would be involved in directly determining the projection of the distance OR between the reference point and the range finder to the line OT between the reference point and the target. For this reason the distance OR is broken into horizontal and vertical components OS and RS hereinafter referred to as horizontal component $d$ and vertical component $h$.

The length of a projection OS′ of the horizontal component $d$ to a vertical plane OTT′ including the line OT between the reference point and the object may be represented by the following equation $$OS' = d \cos \alpha \quad (1)$$

wherein the angle $\alpha$ is the horizontal angle between the horizontal component $d$ and the horizontal projection OT′ of the line OT to the object. Since most fire control systems normally measure the azimuth angular position ($A_0$) of an object from a fixed reference, it may be easier to measure the angle $\alpha$ as the difference between the azimuth angle $\Delta A$ of the horizontal component $d$ and the azimuth angle $A_0$ of the object T. Then Equation 1 may be written as $$OS' = d \cos (A_0 - \Delta A) \quad (2)$$

In order to determine the projection OS″ of the horizontal component $d$ to the line OT between the reference point and the object, it is necessary to multiply the line OS′ by the cosine of the elevation angle ($E_0$) of the target. Thus, the projection of the distance of the horizontal component $d$ to the line OT as represented by the line OS″ may be expressed as follows $$OS'' = d \cos (A_0 - \Delta A) \cos E_0 \quad (3)$$

Since the vertical component $h$ of the distance between the reference point and the range finder is parallel to the vertical plane OTT′ including the line OT between the reference line and the object, its projection R′S′ to the vertical plane OTT′ has the same length as the vertical component $h$. By inspection of Fig. 1 it will be apparent that the projection of the vertical component $h$ to the line OT between the reference point and the target as represented by the line R″S″ may be expressed as $$R''S'' = h \sin E_0 \quad (4)$$

The range difference value ($\Delta D$) is equal to the sum of the projection OS″ of the horizontal component $d$ and the projection R″S″ of the vertical component $h$. Hence the range difference ($\Delta D$) may be determined as $$\Delta D = d \cos (A_0 - \Delta A) \cos E_0 + h \sin E_0 \quad (5)$$

By substituting trigonometric identities, Equation 5 may be written as $$\Delta D = \frac{d}{2} \cos [(A_0 - \Delta A) + E_0] + \frac{d}{2} \cos [(A_0 - \Delta A) - E_0] + h \sin E_0 \quad (6)$$

Fig. 2 illustrates a mechanical solution of Equation 6. The range, as measured by the range finder, may be introduced into the mechanism by a shaft 11, the displacement of which corresponds to the range ($D_R$) of the object as measured by the range finder. The shaft 11 rotates a pinion 12 which drives a gear 13 representing one input of a differential 14, the other input of which, as represented by shaft 15, corresponds to the range difference value ($\Delta D$). Output gear 16 of a differential 14 drives gear 17 which rotates shaft 18 in accordance with the range ($D_0$) of the object relative to the reference point. The displacement of the shaft 18 may thus be used to supply corrected range data to the system.

When the system is set up for operation, the horizontal and vertical components $d$ and $h$ of the distance between the reference point and the range finder may be set into the mechanism by a rotation of dials 21 and 22, respectively, corresponding to the horizontal and vertical distances as measured by some suitable instrument. At this time the azimuth angle of the line between the range finder and the reference point may also be set into the mechanism as by a dial 23.

As the sighting apparatus used in the system tracks a target, the azimuth ($A_0$) and elevation ($E_0$) angular positions of the target may be continuously supplied to the parallax corrector by rotation of handwheels 24 and 25, respectively. Obviously, servo devices or other means could be employed to continuously supply target orientation data.

When the dial 23 is set, it rotates shaft 27 which drives pinion 28 that meshes with gear 29 forming one input of a difference differential 31 to supply the differential 31 with the azimuth angle ($\Delta A$) of the line between the reference point and the range finder. The other input of the differential 31 as represented by shaft 32, is driven by the handwheel 24 in accordance with the azimuth angle ($A_0$) of the target. Output gear 33 of the difference differential 31 is thus rotated in accordance with the value ($A_0 - \Delta A$) which is equal to the difference in azimuth angular position between horizontal component $d$ and the line OT′ between the reference point and the horizontal projection of the target.

Gear 33 meshes with a gear 34 which drives shaft 35 forming one input of an adding differential 36. The other input of the differential 36, as represented by gear 37, is driven by a gear 38 from shaft 39 that is rotated by the handwheel 25 in accordance with the elevation angle ($E_0$) of the target. Output gear 41 is thus driven in accordance with the expression [($A_0 - \Delta A$) + $E_0$].

The output gear 41 drives slotted disc 42 of a conventional component-resolving mechanism in accordance with the algebraic sum of these angles. The disc 42 is formed with a radial slot 43 having a block 44 slidable therein. Radially offset pins 45 and 45′ extend above and below the block 44. The lower pin 45′ rides in a spiral groove 46 formed in the surface of a disc 47 that is driven by a gear 48 of compensating differential 49 in accordance with the length of the horizontal component $d$. The length of horizontal component $d$ is set into the differential 49 by rotation of shaft 51 in accordance with the setting of dial 21. Thus, rotation of the discs 42 and 47 positions the pins 45 and 45' radially of the discs in accordance with the length of the horizontal component $d$ and angularly about the center line of the discs in accordance with the algebraic sum $[(A_0-\Delta A)+E_0]$. Gear 52 of the compensating differential 49 is driven through an idler gear 50 by the slotted disc 42 in order to prevent relative rotation of the discs 42 and 47 during rotation of the slotted disc, thereby preventing radial movement of the pin 45 when only angular movement is desired.

Pin 45 is adapted to slide in a slot 53 formed in an arm 54 on a rack 55 that is slidably mounted to permit longitudinal movement of the rack. The gearing for the spiral grooved disc 47 is so arranged that the pins 45 and 45' are moved radially in accordance with half the distance $d$. This may be accomplished by properly calibrating the dial 21 or selecting appropriate gearing. The discs 42 and 47 are so arranged that the pin 45 moves the rack 55 in accordance with the expression $$\frac{d}{2} \cos [(A_0-\Delta A)+E_0]$$

The radial offset between pins 45 and 45' is sufficient to permit the upper pin 45 to position the arm 54 at the center of the disc 42. Since the spiral groove cannot be used at the exact center of the disc 47, the lower pin 45' will be displaced radially when the upper pin 45 is at the center of the disc 42.

The rack 55 drives pinion 56 in accordance with the above expression. The pinion 56 drives through shaft 57 and gear 58 to rotate a gear 59 forming one input of a differential 61.

It will be apparent from the foregoing description that the component-resolving mechanism acts as a multiplier to obtain a product of the horizontal component of the distance between the reference point and the range finder and a function of the sum of the azimuth and elevation angular positions of the target, compensation being made for the azimuth angle of the horizontal component $d$.

A second input gear 62 of the differential 61 is driven by a pinion 63 on shaft 64 that is rotated by a pinion 65 which meshes with rack 66 of a second component-resolving mechanism. This resolving mechanism acts as a multiplier to position the rack 66 in accordance with the product of horizontal component $d$ and a function of the difference of the azimuth and elevation angular distance of the target after compensating for the azimuth angle between the reference point and the range finder. Shaft 35, which is driven by differential 31 in accordance with the difference of the azimuth angle ($A_0$) of the target and the azimuth angle ($\Delta A$) of the range finder, forms one input of a difference differential 68, the other input of which, as represented by gear 67, is driven through an idler gear 70 by pinion 71 of the shaft 39 that is rotated by handwheel 25 in accordance with the elevation angle ($E_0$) of the target.

Output gear 72 of the difference differential is rotated in accordance with the expression $$[(A_0-\Delta A)-E_0]$$

and drives slotted disc 73 in accordance with the algebraic sum of these angles. The disc 73 is formed with a slot 74 carrying a slidable block 75 which has radially offset pins 76 and 76' extending above and below the block respectively.

The lower pin 76' rides in a spiral groove 77 formed in a disc 78. The spiral-groove disc 78 is driven by output gear 79 of compensating differential 81 in accordance with the horizontal component $d$, as determined by the setting of dial 21 which rotates shaft 51 forming an input of the differential 81. The compensating differential 81 is also driven by gear 82 which rotated by idler gear 80 that meshes with the gear on the slotted disc 73 to prevent relative movement between the discs 73 and 78 during rotation of the slot 74.

The upper pin 76 is adapted to engage a slot 84 formed in an arm 85 on the rack 66. Since the pins 76 and 76' are positioned radially by the groove 77 in the disc 78 according to the length of the horizontal component $d$ and are positioned angularly about the center of the discs in accordance with the algebraic sum of the angles represented by the output of difference differential 68, rack 66 is positioned in accordance with the expression $$\frac{d}{2} \cos [(A_0-\Delta A)]-E_0$$

The factor of one-half of the length of the horizontal component $d$ may be introduced in any manner, such as those previously suggested in connection with the first component resolving mechanism. As previously explained, the pinion 65 drives gear 63 and gear 62 to supply the product of the horizontal component $d$ and the cosine of the difference of the azimuth and elevation angles of the target to the differential 61 which combines the outputs of the two multipliers in shaft 87 forming one input of a differential 88.

The output shaft 87 of differential 61 is thus positioned in accordance with the length of a projection of the horizontal component $d$ to a line between the reference point and the object. See Equations 5 and 6. It is now only necessary to add the length of the projection of the vertical component $h$ to the line between the reference point and the object in order to determine the range difference value. This addition is accomplished by the differential 88 in a manner now to be described.

The shaft 39 which is positioned by handwheel 25 in accordance with the elevation angle ($E_0$) of the object rotates pinion 89 which drives through idler gear 91 to position slotted disc 92 in accordance with said elevation angle. The disc 92 forms a part of a component-resolving mechanism or multiplier and is formed with a slot 93 that has a block 94 slidable therein and carrying radially offset pins 95 and 95' above and below the block. The pin 95' is positioned radially by a spiral groove 96 formed in the surface of disc 97.

The setting of the dial 22 in accordance with the vertical component $h$ rotates the shaft 96 which drives through gears 97 and 98 to rotate shaft 99 forming an input of compensating differential 101. Gear 102 of the compensating differential 101 is driven by idler gear 100 that meshes with a gear on the slotted disc 92, and output gear 103 drives the disc 97. The compensating differential merely serves to prevent relative movement between the two discs when only angular movement of the slot 93 is desired.

In this manner the pins 95 and 95' are positioned radially in accordance with the length of the vertical component $h$ of the distance between the reference point and the range finder. The discs 92 and 97 are so arranged that the upper pin 95, which rides in slot 105 formed in arm 106 on rack 107, positions the rack 107 in accordance with the product of the length of the vertical component $h$ and the sine of the elevation angle $(E_0)$.

As shown in the drawing, the slot 93 extends on both sides of the center of the disc 92. Obviously the point R of the range finder may be arranged either above or below the reference point O. Therefore, the vertical component $h$ of the distance between the points, O and R may be either positive or negative. Therefore, the arm 106 must be positioned on one side or the other of the center of disc 92 depending whether the range finder R is above or below the reference point O. The movement of the arm 106 on opposite sides of the center of the discs is accomplished by radially offsetting the upper and lower pins 95 and 95'. The amount of this offset must be sufficient to permit the upper pin 95 to move the arm 106 equal amounts on opposite sides of the center of the discs during a corresponding radial movement of the lower pin on one side of the center.

The rack 107 drives pinion 108 which rotates shaft 109 and gear 111 to position input gear 112 of the differential 88 in accordance with this product of the vertical component $h$ and the sine of the elevation angle. Output gear 113 of the differential 88 is positioned in accordance with the sum of the outputs of the three multipliers. This sum is the same as the expression on the right-hand side of Equation 6 and corresponds to the range difference value $(\Delta D)$. The gear 113 drives gear 114 which positions the shaft 15 to supply the range difference value to the differential 14, where it is added to the measured range $(D_R)$ to obtain the actual range between the reference point and the object.

Summarizing the operation of the mechanical parallax corrector in Fig. 2, it will be apparent that the horizontal component $d$ of the distance between the reference point and the range-finder is multiplied by the functions of the angular position of the target in order to obtain projection of the horizontal component $d$ to the line between the reference point and the object. Similarly, the vertical component $h$ is multiplied by the function of the angular position of the target to determine its projection to the line between the reference point and the object. The lengths of the two projections are added to obtain the range difference value which is in turn added to the measured range in order to obtain a corrected range value.

In some cases it may be desirable to introduce the range difference value electrically rather than mechanically, as was done in the range parallax corrector just described. Where the range value is transmitted electrically from the range-finder to some other part of the system, such as a director, it may be desirable to introduce an electrical correction in the transmission system.

Fig. 3 illustrates an electrical range parallax corrector embodying the invention, in which a range signal is produced by a range transmitter 121 corresponding to the range as measured by the range-finder. This signal is transmitted to a receiver 122 which supplies it to the system, as, for example, by controlling a range servo device 123 which may be of any suitable type. The transmitter and receiver system may be of any suitable type synchro-transformer or Selsyn to supply data from the range-finder to the reference points of the system.

In the system shown in the drawings, the transmitter 121 includes a rotor winding 124 that is energized from a suitable source, such as that represented by terminals 125, and induces a voltage in stator windings 126 which are connected to stator windings 127 of the receiver 122. Norcally, rotor winding 128 of the receiver 122 provides a signal which controls the servo device 123 until the position of the receiver rotor winding 128 corresponds to the position of the transmitter rotor winding 124. By inserting a correction signal in the circuit of receiver rotor winding 128 corresponding to the range difference value, it is possible to maintain a displacement between the output of the range servo device 123 and the position of the transmitter rotor winding 124. Thus, the range as measured by the range-finder may be corrected electrically so the range servo device is positioned in accordance with a corrected range value corresponding to the range of the object relative to the reference point.

Frequently, fire control systems include electrical transmitting apparatus for controlling servo devices by electrical transmission systems to supply data corresponding to the angular position of the target. In this case, a handwheel 131, shown as rotating shaft 132, positions rotor winding 133 of a transmitter 134 in accordance with the elevation angle $(E_0)$ of the target as measured at the reference point O. Transmitter 134 includes three stator windings 135 which are arranged in a Y connection in circuit with Y-connected stator windings 136 of a receiver 137. Rotor winding 138 of the receiver 137 may control an elevation angle $(E_0)$ servo device 139 in accordance with signals from the transmitter 134 to drive the elevation angle into a computing mechanism. Obviously automatic apparatus could be substituted for the handwheel 131 to position shaft 132 in accordance with the elevation angle $(E_0)$.

In one arrangement of the transmitter 134, a voltage across any two of the Y-connected stator windings 135 may be made proportional to the sine of the elevation angle $(E_0)$. Similarly, the voltage between the end of any one of the windings and a neutral point of the Y-connected transmission system may be made proportional to the cosine of the elevation angle.

Leads 141 and 142 are connected across two of the stator windings 135 and are also connected to leads 143 and 144. The lead 143 is connected to one end of a potentiometer 145, and lead 144 is connected through a variable resistor 146 to the opposite end of the potentiometer 145. Thus, a voltage proportional to the sine of the elevation angle $(E_0)$ is supplied to the potentiometer 145 which acts as a multiplier.

Rotation of dial 147 positions a shaft 148 in accordance with the length of the vertical component $h$ of the distance between the reference point and the range finder and drives through a worm gear 149 which meshes with gear sector 151 to position potentiometer slider 152 in accordance with the length of the vertical component $h$. Thus, the voltage of the slider corresponds to the vertical component $h$ and the sine of the elevation angle $(E_0)$.

Since the vertical component of the distance between the reference point and the range finder may extend upwardly or downwardly, provision is made for introducing positive or negative values of this component into the range parallax corrector. The center point of the potentiometer 145 is connected to the range servo device 123. The potentiometer slider 152 is positioned to one side or the other of the center-point, depending on whether the vertical component $h$ extends upwardly or downwardly.

Leads 143 and 144 are also connected to a pair of chokes 153 and 154. A rotary winding 155 of a suitable rotary transformer is connected by lead 156 to the third Y connected winding of the stator windings 135. The opposite ends of the chokes 153 and 154 and the rotary winding are connected together to form a balanced Y connected circuit across the stator windings 135. In this manner the rotor winding 155 is connected between a neutral point of the three-wire system and one of the ends of stator winding 135 so its voltage is proportional to the cosine of the elevation angle.

A dial 158 is positioned in accordance with the azimuth angle of the range-finder and rotates shaft 159 which drives through pinion 161 to position input gear 162 of a difference differential 163 in accordance with the azimuth angle of the range-finder. Another input gear 164 of the differential 163 is positioned by pinion 165 on shaft 166 that is rotated by handwheel 167 in accordance with the azimuth angle of the target. If desired, an automatic device such as a servo motor could be used to rotate the shaft 166 according to the azimuth angle ($A_0$) as measured at the reference point O. Output shaft 168 of the difference differential 163 rotates rotary winding 155 of the rotary transformer in accordance with the difference angle ($A_0 - \Delta A$) which is the azimuth angle between the range-finder and the object.

In this manner, the voltage appearing across stator winding 169 of the rotary transformer is multiplied by the cosine of the azimuth difference angle ($A_0 - \Delta A$) and hence is proportional to the product of the cosine of the azimuth difference angle and the cosine of the elevation angle, that is cosine ($A_0 - \Delta A$) cos $E_0$. The voltage of stator winding 169 corresponding to this product, is supplied through a variable resistor 171 to opposite ends of a potentiometer 172 where it is multiplied by a value corresponding to the length of the horizontal component $d$ of the distance between the range-finder and the reference point.

A dial 173 is positioned in accordance with the length of the horizontal component $d$ and rotates a shaft 174 which drives through a worm gear 175 and gear sector 176 to position potentiometer slider 177 in accordance with the length of the horizontal component $d$. Thus, the above mentioned product is also multiplied by the length of the horizontal component $d$ whereby the output voltage of potentiometer slider 177 corresponds to the projection of the horizontal component $d$ to the line between the reference point and the object.

As has been described, the voltage of potentiometer slider 152 corresponds to the projection of the vertical component $h$ to the line between the reference point and the object, so it is only necessary to combine the voltages of the two potentiometer slides in order to obtain a voltage corresponding to the range difference value. Potentiometer slider 152 is connected as by lead 181 to one end of potentiometer 172. Potentiometer slider 177 is connected by lead 182 to one end of the rotor winding 128 of the range receiver. As already explained, the center point of potentiometer 145 is connected by lead 183 to the range servo device. Hence, a series circuit including the voltages of the two potentiometer sliders and the rotary winding 128 controls the range servo device 123.

Variable resistors 146 and 171 are adjusted so the correct proportion of the voltages at the sliders 152 and 177 is obtained as compared with the signal voltage produced by the rotary winding 128. Once the desired proportion is obtained, the setting of variable resistors 146 and 171 remains unchanged. In this manner the output of the range servo device 123 is maintained offset from rotor winding 124 of the transmitter 121 by an amount corresponding to the required correction for parallax, which correction is in accordance with the voltage across leads 182 and 183. The output of the range servo device corresponds to the slant range value $D_0$ at the point O, which is the observed range $D_r$ corrected for parallax.

The circuit just described could easily be modified to fulfill requirements of various situations. For example, the orientation of the transmission system could be revised so the voltage between any two leads would correspond to the cosine of the elevation angle in which case the voltage between one lead and a neutral point would correspond to the sine of the elevation angle. This would necessitate changing the connections of the rotor winding 155 and the potentiometer 145. However, the operation would not be impaired. Actually the system might be simplified by eliminating the chokes 153 and 154.

Another obvious modification would be to substitute a two phase transmission system in which case the voltages across the two windings of the transmitter would correspond to the sine and cosine of the elevation angle. The rotary transformer winding 155 and potentiometer 145 could be connected directly across these two coils. The system would continue to operate in the same manner.

Fig. 4 shows a somewhat similar circuit to that shown in Fig. 3 except a different arrangement is used to determine the trigonometric functions of the elevation angle ($E_0$). The various components of range transmitter 121 and receiver 122, as well as the range servo device 123, correspond to those shown in Fig. 3 and have been given corresponding reference numerals. Dial 147 is used to rotate shaft 148 which drives through worm gear 149 and gear sector 151 to position slider 152 of potentiometer 145 in accordance with the length of the vertical component $h$. Similarly, dial 173 rotates shaft 174 to drive through worm gear 175 and sector 176 to position slider 177 of potentiometer 172 in accordance with the horizontal component $d$.

The azimuth angle ($\Delta A$) of the range-finder is set in by dial 158 which drives through shaft 159, pinion 161, and input gear 162 of the difference differential 163. The azimuth angle of the target is supplied to the difference differential 163 by rotation of handwheel 167 which drives through shaft 166 and gear 165 to rotate input gear 164 whereby output shaft 168 positions rotary winding 155 of the rotary transformer in accordance with the azimuth difference angle ($A_0 - \Delta A$).

A signal generator 191 has a stator winding 192 connected through a variable resistor 193 to a suitable source of voltage 194. Two-phase rotor windings 195 and 196 are rotated by shaft 197 on handwheel 198 in accordance with the elevation angle ($E_0$) of the object. The two-phase windings are so arranged that the voltage of winding 196 is proportional to the sine of the elevation angle and is connected directly across the terminals of the potentiometer 145. The voltage of winding 195 is then proportional to the cosine of the elevation angle and is connected directly across the rotor winding 155 of the rotary transformer.

Since the rotor winding 155 is rotated in accordance with the azimuth difference angle $(A_0-\Delta A)$ by the shaft 168, the voltage of stator winding 169 corresponds to the product of the cosine of the elevation angle $(E_0)$ and the cosine of the azimuth difference angle $(A_0-\Delta A)$, that is, the expression $\cos(A_0-\Delta A)\cos E_0$. This voltage is supplied directly across the terminals of potentiometer 172.

Since the slider 177 of potentiometer 172 is rotated in accordance with the length of the horizontal component $d$, the voltage of the potentiometer slider corresponds to the projection of the horizontal component $d$ to the line between the object and the reference point, as determined by Equation 3. Similarly, the voltage of potentiometer 152 corresponds to the projection of the vertical component $h$ to the line between the object and the reference point as determined by Equation 4.

Potentiometer slider 177 is connected as by lead 201 to the mid-point of potentiometer 145. Potentiometer slider 152 is connected as by lead 202 to one end of the rotor winding 128 of the range receiver, the other end of which is connected directly to the range servo device 123. One end of potentiometer 172 is also connected as by lead 203 to the range servo device 123. Hence, a series circuit including the voltages of the two potentiometer sliders and the voltage of rotary winding 128 controls the operation of the range servo device 123.

This series circuit produces a displacement between the output of the range servo device 123 and the rotor winding 124 of the range transmitter which corresponds to the required correction for parallax.

In both of the electrical solutions, signals are produced corresponding to functions of the angular position of the target, and potentiometers are used to multiply certain of these functions by the horizontal and vertical components of the difference between the reference point and the range finder. The product represented by the voltage outputs of the potentiometers corresponds to the projection of the horizontal and vertical components to the line between the target and the reference point. These voltages when combined are in accordance with the range difference value and are used as described to modify or correct the signals proportional to observed range $D_r$ in order that the output of the servo device 123 will be in accordance with the slant range $D_0$ at the point O.

Since many changes could be made in the above construction and many apparently widely different embodiments of this invention could be made without departing from the scope thereof, it is intended that all matter contained in the above description or shown in the accompanying drawings shall be interpreted as illustrative and not in a limiting sense.

What is claimed is:

1. In a range parallax corrector, apparatus for determining the difference in the range of an object relative to a reference point and the range of said object as measured by a range-finder spaced from and at a different level with respect to the reference point, comprising a device for setting into the apparatus a horizontal component of the distance between said range-finder and said reference point, means for producing a signal voltage corresponding to cosine functions of the azimuth difference angle $\alpha$ and elevation angular positions of said object relative to said reference point, a multiplier comprising a potentiometer adjusted by said device and energized by the signal voltage from said means for obtaining a signal voltage corresponding to the product of said horizontal component and the cosine functions of said angular positions, a second device for setting into the apparatus a vertical component of the distance between said reference point and said range-finder, a multiplier comprising a potentiometer having a contact arm connected to a terminal of the first potentiometer actuated by said second device and energized by said means in proportion to the sine of the elevation angle of the target for obtaining a signal voltage proportional to the product of said vertical component and the sine function of said elevation angular position, and means controlled by said multipliers for adding said product voltages, the sum of the voltages being a close approximation of a voltage proportional to the difference in range.

2. In a range parallax correcting apparatus for determining the difference in range of a target relatively to a tracking device and the range of the target as measured by a range-finder spaced from the tracking device, means local to the tracking device for computing the azimuth difference angle $\alpha$ as the difference between the azimuth angle of the target and the azimuth angle at which the range-finder may be offset from the tracking device, a pair of devices each having an input actuated by the output of the first mentioned means and a second input actuated according to the elevation angle of the target, one of the devices having an output proportional to the sum of the azimuth difference angle $\alpha$ and the elevation angle of the target, the other device having an output proportional to the difference between the azimuth difference angle $\alpha$ and the elevation angle of the target, a pair of multipliers each having an input actuated in proportion to the distance between the range-finder and the tracking device, a second input for each multiplier actuated respectively by the respective outputs of the last mentioned pair of devices, means for combining the outputs of the multipliers, the output of the last mentioned means being proportional to the difference in range of the target from the tracking device and the range of the target as measured by the range-finder.

3. A range parallax corrector according to claim 2 in which the means for computing the azimuth difference angle $\alpha$ comprises a differential, one input being displaced according to the azimuth angle of the target with respect to the tracking device, and the other input being displaced according to the azimuth angle at which the range-finder is offset from the tracking device, the differential being effective to displace its output according to the difference between its input displacements.

4. A range parallax corrector according to claim 2 in which the pair of devices comprise a pair of differentials each having one input displaced according to the azimuth difference angle $\alpha$, shaft and gear means for displacing a second input for each differential according to the elevation angle of the target with respect to the tracking device, one differential having an output in accordance with the sum of its input displacements, and the other having an output in accordance with the difference of its input displacements.

5. A range parallax corrector according to claim 2 in which the multipliers of said pair of multipliers are resolving devices each comprising a pair of discs, one disc of each pair being displaced in proportion to the distance between the tracking device and the range-finder and the other discs being displaced respectively according to the sum of the target elevation angle and the azimuth difference angle, and according to the difference of the elevation angle and the azimuth difference angle.

6. A range parallax corrector according to claim 2 in which the multipliers of said pair of multipliers are resolving devices, each comprising a pair of discs, one disc of each pair being provided with a spiral slot and the other with a radial slot, a pin and an output member displaced thereby for each resolving device, the respective pins being displaced by the relative rotation of the associated discs, the disc of each pair having the spiral slot being displaced in proportion to the distance between the range-finder and tracking device, the other disc of one pair being displaced in accordance with the sum of the elevation angle of the target and the azimuth difference angle $\alpha$, and the other disc of the other pair being displaced in accordance with the difference of these angles.

DAVID J. CAMPBELL.
HERBERT HARRIS, Jr.
ARTHUR A. HAUSER, Jr.

REFERENCES CITED

The following references are of record in the file of this patent:

UNITED STATES PATENTS

| Number | Name | Date |
|---|---|---|
| 2,235,826 | Chafee | Mar. 25, 1941 |
| 1,755,975 | Willard | Apr. 22, 1930 |

FOREIGN PATENTS

| Number | Country | Date |
|---|---|---|
| 499,265 | Great Britain | Jan. 20, 1939 |
| 208,266 | Great Britain | Dec. 20, 1923 |